United States Patent [19]

Hutchinson

[11] Patent Number: 4,789,726

[45] Date of Patent: Dec. 6, 1988

[54] MANUFACTURE OF POLYESTERS

[75] Inventor: Francis G. Hutchinson, Lymm, England

[73] Assignee: Imperial Chemical Industries PLC, London, England

[21] Appl. No.: 33,196

[22] Filed: Apr. 2, 1987

[30] Foreign Application Priority Data

Apr. 18, 1986 [GB] United Kingdom ............... 8609537

[51] Int. Cl.$^4$ ..................... C08G 63/76; C08G 63/02
[52] U.S. Cl. ................................... 528/354; 528/361; 525/415; 525/437; 560/185
[58] Field of Search ............... 528/354, 361, 499; 525/415, 437; 560/185

[56] References Cited

U.S. PATENT DOCUMENTS 3,297,033 1/1967 Schmitt et al. .
3,773,919 11/1973 Boswell et al. .
3,839,297 10/1974 Wasserman et al. ........... 528/354 X
4,273,920 6/1981 Nevin ............................... 528/354 X
4,443,430 4/1984 Mattei et al. .................... 528/354 X

FOREIGN PATENT DOCUMENTS 0058481 8/1982 European Pat. Off. .

OTHER PUBLICATIONS

Makino et al., "Preparation and In Vitro Degradation Properties of Polylactide Microcapsules", Chem. Abst. 102,209367u (1985).

Primary Examiner—Earl Nielsen
Attorney, Agent, or Firm—Cushman, Darby & Cushman

[57] ABSTRACT

A process for the manufacture of polyesters, especially polylactides or poly(lactide-co-glycolide) of specified low-medium molecular weight, by controlled hydrolysis of a higher molecular weight polyester.

7 Claims, No Drawings

MANUFACTURE OF POLYESTERS

This invention relates to the manufacture of polyesters, and in particular it relates to polyesters of a particular desired molecular weight and molecular weight distribution or polydispersity.

Many polyesters possess the property of being biodegradable within an animal body, and they have therefore found utility in recent years in a variety of biomedical applications, for example as resorbable sutures, implants and prostheses, and as carriers in sustained release formulations of various drugs.

Particular polyesters which are known to be useful for such purposes are those derived from hydroxy-acids, such as lactic, glycolic and 3-hydroxybutyric acids, or from lactones such as lactide, glycolide and epsilon-caprolactone, or co-polyesters derived from two such monomers, in particular poly(lactic-co-glycolic) acids and poly(lactide-co-glycolide).

When such polyesters are used for biomedical purposes within an animal body, and particularly when used within the human body, they are, of course, subject to rigid specifications of purity and toxicological and physiological acceptability. They should be free from extraneous low molecular weight impurities, and of consistent quality. In particular, when such polyesters are used as drug carriers in sustained release formulations, the profile of drug release is determined and controlled by a number of parameters, among the most important of which are the molecular weight and the polydispersity. [Polydispersity is a measure of molecular size distribution, and is defined as the ratio of the weight average molecular weight ($M_w$) to the number average molecular weight ($M_n$)].

Heretofore, it has been difficult or impossible to manufacture reproducibly, and in good yield, biodegradable polyesters of a particular desired molecular weight, especially those having Mw less than about 15,000, and having a desired polydispersity. Biodegradable polyesters have been manufactured in a number of different ways, but these preparations have not allowed the polydispersity to be controlled, nor, in many cases, the molecular weight of the purified polyester.

For example, polyesters and co-polyesters based upon lactic acid and/or glycolic acid and of relatively low molecular weight, say Mw less than 10,000, can be prepared by the polycondensation polymerisation of the hydroxy-acid or acids. It is found, however, that in this procedure, the product contains a substantial level of low molecular weight polymer, and of unpolymerised monomer, which cannot easily be removed. This is illustrated by an experiment in which DL-lactic acid was heated at 200° C. for 8 hours under an atmosphere of nitrogen, to give a product having an inherent viscosity of 0.08 dl/g (measured as a 1% solution in chloroform at 25° C.) This product contained polymer, unreacted lactic acid, and DL-lactide formed by cyclic dimerisation of the DL-lactic acid monomer. The DL-lactide cannot be satisfactorily removed from the product by the application of high vacuum, since although this removes most of the DL lactide, it also results in further polymerisation of the already formed polymer, as indicated by an increase in inherent viscosity to 0.12 dl/g. This increase in viscosity is indicative of an increase in the Mw of the product polymer from about 3,500 in the crude to about 6,000 in the vacuum-dried product. Accurate control of molecular weight can clearly not be achieved by this procedure.

Alternative purification techniques involving precipitation of the polymeric product also are not capable of providing polyesters having the required properties. It is known to purify polymers by adding a solution of the polymer to an excess of a non-solvent for the higher molecular weight species of the polymer. By this means, the polymer can be fractionated, the higher molecular weight species being precipitated while the lower molecular weight species are retained in solution or dispersion. For polymers of molecular weight less than about 10,000, this procedure can result in low yields of purified polymer, and also, a polymer product which, having been obtained by the selective precipitation of the higher molecular weight components, consequently usually has a significantly higher molecular weight than the crude product from which it was obtained.

This is illustrated by an experiment in which a low molecular weight poly(DL-lactide) was prepared by ring-opening polymerisation of DL-lactide, using an organo-tin catalyst, and DL-lactic acid as a chain terminator to control the molecular weight of the product polyester. This crude poly-(DL-lactide) product had inherent viscosity of 0.108 (1% WV in chloroform at 25° C.), $M_w$ of 5500 and $M_n$ of 2400, giving a polydispersity of 2.3. This crude polyester was dissolved in acetic acid and the solution was added with vigorous stirring to methanol, which is a non-solvent for higher molecular weight poly(DL-lactide). The purified polymer so obtained had inherent viscosity 0.16 (same conditions as above), $M_w$ of 10370 and $M_n$ of 8340, giving a polydispersity of 1.24. This purification procedure gave only a low yield of purified product, and the purified product had molecular weight properties quite different from those of the initial crude product. It is clearly not possible by this means to produce consistently a polyester of a particular required molecular weight and polydispersity.

High molecular weight polyesters and co-polyesters of lactic acid and/or glycolic acid can be prepared by the ring-opening polymerisation of the appropriate dimers, DL-, L- or D-lactide or glycolide, using appropriate known catalysts. If suitable chain-transfer or chain-terminating agents are used, polyesters of lower, but controlled molecular weight can be obtained, but it is difficult or impossible to obtain consistently a purified polyester of $M_w$ less than about 10,000 using precipitation techniques. These medium to high molecular weight polyesters can be satisfactorily purified by precipitation techniques, but the polydispersity of the purified polyesters so obtained is always in the range of 1.8–2.2, that is, close to the most probable distribution (polydispersity=2). This process of manufacture thus does not allow the controlled preparation of polyesters having polydispersity more than about 2, or having particular unsymmetrical or multinodal molecular weight distributions. The technique is also unsuitable for the consistent and reproducible preparation of polyesters of $M_w$ less than about 10,000.

By contrast, the present invention provides a process for the manufacture of polyesters having any desired $M_n$ less than about 20,000, having any desired molecular weight distribution, and usually in good yield. This invention is based upon the appreciation that higher molecular weight polyesters can be readily prepared, easily purified in good yield, and then controllably hydrolysed to polyesters of the desired lower molecular weight, and molecular weight distribution.

Thus, according to the invention, there is provided a process for the manufacture of a polyester, of any desired number average molecular weight, $M_n$, less than about 20,000 as measured by size exclusion chromatography relative to polystyrene standards, characterised by the hydrolysis, with an aqueous acid, of a polyester of the same chemical composition as the desired polyester but having a higher number average molecular weight, $M_n^o$, measured as defined above, than the desired polyester product, for a period of time, t, determined from the equation:

$$\frac{1}{M_n} - \frac{1}{M_n^o} = Kt$$

wherein K is a constant which has been predetermined by a calibration experiment using the particular polyester, the particular water, acid and polyester concentrations, and the particular hydrolysis temperature desired.

Since, the rate of hydrolysis of polyester is temperature dependent, being very much faster at elevated temperature than at ambient temperature, it is preferable in practice to carry out the process of the invention at ambient temperature, which allows the most accurate control of the molecular weight of the product. If less accurate control of molecular weight is acceptable, the product can be obtained more quickly by carrying out the hydrolysis at an elevated temperature, for example at the reflux temperature of the aqueous acid being used.

The calibration of the reaction is carried out by first selecting the starting polyester, the hydrolysing acid, their relative proportions and the reaction temperature, then commencing the reaction at that temperature, sampling the reaction mixture at appropriate time intervals, determining $M_n$ for each sample, and then plotting $1/M_n$ against time. A straight line relationship is obtained, and from this graph, the reaction time, t, can be determined which is required to obtain a polyester of any desired $M_n$, under those particular conditions and from that particular polyester starting material.

The process of the invention is particularly useful for the preparation of polylactic acid or poly(lactic-co-glycolic) acid required for the controlled release of polypeptide drugs, and for the preparation of these polyesters, acetic acid is the preferred acid for the hydrolysis. Typically, the polyester starting material will have a molecular weight in the range $M_n=20,000$ to 100,000, and the hydrolysis with acetic acid takes from about 0.5 to about 4 hours at reflux temperature to produce a polyester of $M_n=5000$ to 30,000, or up to several weeks at ambient temperature.

If the polyester starting material has a polydispersity of about 2, corresponding to the statistically most probable distribution of molecular species, the polyester product will retain essentially the same polydispersity, since the hydrolytic degradation is a random process. It is possible, however, by appropriate control of the hydrolysis reaction, to obtain polyester products of different polydispersity, as required. To achieve this, the hydrolysis reaction is carried out by adding a solution of the polyester starting material in the aqueous acid at ambient temperature, to a reaction vessel heated sufficiently to reflux the polyester solution as it is added. The polyester hydrolyses negligibly slowly in the aqueous acid solution at ambient temperature, but when the solution is introduced to the heated reaction vessel, hydrolysis occurs at a very much faster rate. Thus, by controlling the rate of addition of polyester-acid solution to the heated reaction vessel, polyester products of approximately any required polydispersity or molecular weight distribution can be obtained.

For example, if the polyester-acid solution is added at a constant rate, over the predetermined time period, t, a product polyester of polydispersity greater than about 2.5 is obtained, the molecular weight distribution of which is unsymmetrical and possesses a substantial low molecular weight "tail". Similarly, if the polyester-acid solution is added to the heated reaction vessel at an accelerating rate over time t, a product having a very broad molecular weight distribution is obtained, again having a polydispersity of greater than about 2.5.

Polyester products having polynodal molecular weight distributions can be obtained by adding the polyester-acid solution to the heated reaction vessel in two or more portions, separated by appropriate time intervals. The molecular weight of each node can be controlled as described herein.

When a low molecular weight polyester of low polydispersity (say, less than about 1.5) is required, it is necessary to use a polyester starting material of similar low polydispersity. As indicated above, polyester of $M_n$ greater than about 10,000 can be much more efficiently purified by precipitation fractionation, with much less loss of material, than can lower molecular weight polyesters, to give polymers of low polydispersity. Although the hydrolysis of such polyesters does result in some limited broadening of molecular weight distribution, a polydispersity of about 1.5 can be retained, particularly if $M_n^o$ is not more than about 5 times the $M_n$ of the desired product.

The invention is illustrated, but not limited, by the following Examples. Molecular weights, $M_n$, were determined by size exclusion chromatography as follows:

The chromatography support, or stationary phase, is a cross-linked polystyrene gel with a controlled range of pore sizes, and size separation is based upon partitioning of the solute between the solvent inside the gel particles and the solvent in the spaces between the gel particles. Large molecules have a size in solution, (which is dependent upon molecular structure and the degree of solvation), which is greater than some of the gel pores. Such large molecules are therefore confined to the solvent between the gel particles, and they are therefore eluted first. Smaller solute molecules have access to solvent both inside and outside the gel particles, and thus their progress along the chromatography column is retarded, proportionate to the extent to which they are partitioned into the solvent within the gel particles. The solute molecules are therefore eluted from the column in order of decreasing molecular size. Using a number of polystyrene standards of known molecular weight, the column can be calibrated to relate retention time to molecular weight. The column can then be used to determine the molecular weights, $M_n$ and $M_w$, of another polymer. A chromatogram can be constructed indicating the number of polymer molecules of each molecular weight, and by taking small time slices corresponding to known molecular weights from the calibration, the chromatogram can be integrated to give the number- and weight-average molecular weights for the polymer under investigation.

The molecular weights, $M_w$ and $M_n$, so determined, are not absolute values, but are relative to the polystyrene standards. As an indication of absolute values, an $M_w$ of 5500 corresponds to an inherent viscosity of 0.10 dl/g (1% w/v solution in chloroform at 25°), $M_w$ of 7800 corresponds to inherent viscosity of 0.13 dl/g (1% w/v solution in chloroform at 25°), $M_w$ of 20000 corresponds to inherent viscosity of ~0.3 dl/g, $M_w$ of 50000 corresponds to inherent viscosity of ~0.45 dl/g and $M_w$ of 100000 corresponds to inherent viscosity of ~1.0 dl/g.

EXAMPLE 1

A high molecular weight poly(D,L-lactide) was prepared by the ring-opening polymerisation of dry, freshly-prepared D,L-lactide using an organo-tin catalyst. The polyester so obtained was purified by dissolving it in glacial acetic acid, and then adding that solution to vigorously stirred methanol, and isolating and drying the product polyester. The polyester so obtained had $M_n=59,000$, $M_w=107,500$ by size exclusion chromatography relative to polystyrene standards, and therefore a polydispersity of 1.82.

This polyester (10 g.) and water (1 ml.) were dissolved in glacial acetic acid, and the solution was then diluted to 100 ml. with more glacial acetic acid. The mixture was heated rapidly to reflux temperature, and maintained at that temperature, removing samples at 0.5, 1, 2, 3 and 4 hours. The removed samples were immediately frozen, then freeze-dried, and the molecular weights of each sample were determined by size exclusion chromatography as described above. A plot of $1/M_n$ against t was a straight line of slope $7.4 \times 10^{-5}$ $hr^{-1}$.

From this plot, it was determined that a poly(D,L-lactide) of $M_n=17300$ would be hydrolysed under the specified conditions to an $M_n$ of 7000 in 1 hour. When such a polyester was actually hydrolysed for 1 hour under these conditions, the polyester product so produced had an $M_n$ of 6800, in good agreement with the predicted value.

Similarly, from the calibration plot, it was determined that a polyester of $M_n=5000$ would require the starting polyester of $M_n=17300$ to be hydrolysed for 2 hours. When such a polyester was actually hydrolysed under the specified conditions for 2 hours, the product polyester had $M_n=4700$, in good agreement with the predicted value.

EXAMPLE 2

The process described in Example 1 was repeated, but using 2 ml. of water in the hydrolysis medium instead of 1 ml, and sampling at 0.25, 0.5, 1.0, 1.5 and 2.0 hrs. The plot of $1/M_n$ against time was a straight line of slope $13.2 \times 10^{-5}$ $hr^{-1}$.

From this calibration, it was calculated that a poly(D,L-lactide) of $M_w=64,000$ and $M_n=34,000$ should be degraded under these conditions to a poly(D,L-lactide) of $M_n=4,300$ in 1.5 hrs. When the actual experiment was carried out, the product had $M_w=8,300$ and $M_n=4,050$, in good agreement with the prediction.

EXAMPLE 3

The process described in Example 1 was repeated, but using 3 ml. of water in the hydrolysis medium instead of 1 ml, and sampling at 10, 20, 40, 60 and 90 minutes. The plot of $1/M_n$ against time was a straight line of slope $18.1 \times 10^{-5}$ $hr^{-1}$.

From the calibration, it was calculated that a poly(D,L-lactide) of $M_n=59,000$ should be degraded to $M_n=5,000$ in 1 hr. When the actual experiment was carried out, the product had $M_n=5,200$, in good agreement with the prediction.

EXAMPLE 4

The process described in Example 1 was repeated, but using 4 ml. of water in the hydrolysis medium instead of 1 ml, and sampling at 10, 20, 30, 45 and 60 minutes. The plot of $1/M_n$ against time was a straight line of slope $25 \times 10^{-5}$ $hr^{-1}$.

From this calibration, it was calculated that a poly(D,L-lactide) of $M_n=59,000$ should be degraded to $M_n=12,000$ in this system in 15 minutes. When the actual experiment was carried out, the product had $M_n=13,500$, in good agreement with the prediction.

EXAMPLE 5

A poly(D,L-lactide-co-glycolide) containing 50 mole % each of D,L-lactide and glycolide, of $M_w=68000$ and $M_n=34,000$ (10 g.) and distilled water (1 ml.) were dissolved in glacial acetic acid, and then made up to 100 ml. with the same. The solution was heated under reflux and sampled periodically over 1 hr, the $M_n$ of each sample was determined, and the plot of $1/M_n$ against time was a straight line of slope $20.8 \times 10^{-5}$ $hr^{-1}$.

From this calibration it was calculated that a copolymer of $M_n=67,000$ would be degraded to $M_n=8,300$ in this system in 0.5 hr. When the experiment was carried out, the product had $M_n=8,200$, in good agreement with the predicted value.

EXAMPLE 6

A poly(D,L-lactide-co-glycolide), comprising 75 mole % D,L-lactide and 25 mole % glycolide, of $M_w=135,000$ and $M_n=68,000$ (10g.) and distilled water (1 ml.) were dissolved in glacial acetic acid and then made up to 100 ml. with the same. The solution was heated under reflux and sampled periodically over 2 hr, and the $M_n$ of the samples was determined. The plot of $1/M_n$ against time was a straight line of slope $13.3 \times 10^{-5}$ $hr^{-1}$.

From this calibration it was determined that a copolymer of $M_w=36,000$, $M_n=20,500$ would be degraded in this system to a product of $M_n=8,500$ in 0.5 hr. When the experiment was actually carried out, the product had $M_n=8,700$, in close agreement with the predicted value.

EXAMPLE 7

A poly(D,L-lactide-co-glycolide) containing 90 mole % D,L-lactide and 10 mole % glycolide, and of $M_w=100,000$ and $M_n=58000$ (10g), and water (1 ml.) were dissolved in glacial acetic acid, and when diluted to 100 ml. with glacial acetic acid. The solution was heated rapidly to reflux, and the molecular weights of samples removed at 5, 10, 15, 20, 30, 45, 60, 90 and 120 minutes were determined. The plot of $1/M_n$ against time was a straight line of slope $11.2 \times 10^{-5}$ $hr.^{-1}$, based on the following figures.

| Time (minutes) | $M_n$ | $M_w$ |
| --- | --- | --- |
| 0 | 58000 | 100000 |
| 5 | 42000 | 73000 |
| 10 | 29400 | 55600 |
| 15 | 22700 | 44500 |
| 20 | 19000 | 36000 |
| 30 | 14200 | 27400 |
| 45 | 10100 | 19600 |
| 60 | 7900 | 15500 |

-continued

| Time (minutes) | $M_n$ | $M_w$ |
| --- | --- | --- |
| 90 | 5500 | 10700 |
| 120 | 4200 | 8300 |

From these figures, it can be calculated that, it 50 ml. of the starting polyester solution was added to the heated reaction vessel in the sequence of 10 ml. at time zero, followed by 5 ml aliquots at 30, 60, 75, 90, 100, 105, 110 and 115 minutes, the produce polyester should have $M_w=29,890$ and $M_n=8,985$, giving $M_w/M_n=29,890/8,985=3.33$.

When the actual experiment was carried out, the polyester product was found to have $M_w=29,700$, $M_n=8,500$ and therefore $M_w/M_n=29,700/8,500=3.49$, which are in excellent agreement with the predicted values.

EXAMPLE 8

A poly(D,L-lactide-co-glycolide) comprising 90 mole % D,L-lactide and 10 mole % glycolide, and having $M_w=100,000$ and $M_n=58,000$ (10g), and distilled water (1 ml.) were dissolved in glacial acetic acid, then made up to 100 ml. with the same.

50 ml. of this mixture was rapidly heated to reflux, and maintained at that temperature for 2 hrs. The remaining polyester solution (50 ml.) was added, and the mixture was then immediately frozen and freeze-dried. Molecular weights were determined by size exclusion chromatography, and the product was shown, as expected, to have a binodal molecular weight distribution. The product had an overall $M_w=47,000$ and $M_n=9,000$, in good agreement with the calculated values of $M_w=54,000$ and $M_n=8,000$.

EXAMPLE 9

A poly(D,L-lactide-co-glycolide) comprising 95 mole % of D,L-lactide and 5 mole % of glycolide, of $M_w=22,500$ and $M_n=15,100$ (15 g) was dissolved in water (3.5 ml) and glacial acetic acid (31.5 ml) at 20°, and the solution was then maintained at 35° for 7 days. Aliquots were removed after 1, 2, 3, 4 and 7 days, immediately frozen and freeze-dried, and their $M_n$ determined by size exclusion chromatography. The plot of $1/M_n$ against time was a straight line of slope $3.9\times10^{-5}$ day$^{-1}$.

This process was repeated with a similar 95/5 copolymer of $M_w=25,200$ and $M_n=15,200$. The slope of the plot of $1/M_n$ against time in this case was $4.1\times10^{-5}$ day$^{-1}$.

From these calibrations, it was determined that a 95/5 copolymer of $M_w=26,850$ and $M_n=17,300$ should be degraded to $M_n=6,000$ in 2 days 16 hours. When the experiment was carried out, the copolymer product was found to have $M_n=5,400$, in good agreement with the predicted value.

What we claim is:

1. A process for the manufacture of a polyester, of any desired number average molecular weight, $M_n$, less than about 20,000 as measured by size exclusion chromatography relative to polystyrene standards, characterised by the hydrolysis in homogeneous solution, with an aqueous acid, of a polyester of the same chemical composition as the desired polyester but having a higher number average molecular weight, $M_n^o$, measured as defined above, than the desired polyester product, for a period of time, t, determined from the equation:

$$\frac{1}{M_n} - \frac{1}{M_n^o} = Kt$$

wherein K is a constant which has been predetermined by a calibration experiment using the particular polyester, the particular water, acid and polyester concentrations, and the particular hydrolysis temperature desired.

2. A process as claimed in claim 1 wherein the polyester is polylactic acid or poly(lactic-co-glycolic) acid.

3. A process as claimed in claim 2 wherein the aqueous acid is acetic acid.

4. A process as claimed in claim 1 for the manufacture of a product polyester of polydispersity greater than about 2.5, characterised in that a solution of the polyester starting material, of polydispersity about 2, in the aqueous acid at ambient temperature is added at a constant rate, over the predetermined time period t, to a reaction vessel heated sufficiently to reflux the polyester solution as it is added.

5. A process as claimed in claim 1 for the manufactured of a polyester product having a very broad molecular weight range distribution and a polydispersity of greater than 2.5, characterised in that a solution of the polyester starting material, of polydispersity about 2, in the aqueous acid at ambient temperature is added to a reaction vessel, heated sufficiently to reflux the polyester solution as it is added, at an accelerating rate over time t.

6. A process as claimed in claim 1 for the manufacture of a product polyester having a polynodal molecular weight distribution, characterised in that a solution of the polyester starting material material in the aqueous acid at ambient temperature is added in the two or more portions, separated by appropriate time intervals, to a reaction vessel heated sufficiently to reflux the polyester solution as it is added.

7. A process as claimed in claim 1 for the manufacture of a product polyester of polydispersity less than about 1.5, characterised in that the starting polyester has a similar polydispersity, and $M_n^o$ is not more than about 5 times the $M_n$ of the desired product.

* * * * *